United States Patent
Zhou et al.

(10) Patent No.: US 8,120,911 B2
(45) Date of Patent: Feb. 21, 2012

(54) HEAT DISSIPATION DEVICE

(75) Inventors: Hai-Qing Zhou, Shenzhen (CN); Song-Lin Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 82 days.

(21) Appl. No.: 12/840,411

(22) Filed: Jul. 21, 2010

(65) Prior Publication Data

US 2011/0235269 A1    Sep. 29, 2011

(30) Foreign Application Priority Data

Mar. 24, 2010 (CN) .......................... 2010 1 0131517

(51) Int. Cl.
 *H05K 7/20* (2006.01)
(52) U.S. Cl. .......................... 361/695; 361/694; 454/184
(58) Field of Classification Search .................. 361/694, 361/695
See application file for complete search history.

(56) References Cited

U.S. PATENT DOCUMENTS

| 4,739,445 | A | * | 4/1988 | Tragen | 361/695 |
|---|---|---|---|---|---|
| 5,079,438 | A | * | 1/1992 | Heung | 307/141 |
| 5,769,159 | A | * | 6/1998 | Yun | 165/276 |
| 6,735,079 | B2 | * | 5/2004 | Huang | 361/695 |
| 7,492,592 | B2 | * | 2/2009 | Ye et al. | 361/695 |
| 2003/0016494 | A1 | * | 1/2003 | Chen | 361/687 |
| 2008/0024983 | A1 | * | 1/2008 | Anderl et al. | 361/695 |
| 2009/0244843 | A1 | * | 10/2009 | Hirohata et al. | 361/696 |
| 2011/0103007 | A1 | * | 5/2011 | Kao et al. | 361/679.48 |

* cited by examiner

*Primary Examiner* — Gregory Thompson
(74) *Attorney, Agent, or Firm* — Altis Law Group, Inc.

(57) ABSTRACT

A heat dissipation device positioned in a computer case, includes a fan, a plate positioned between the computer case and the fan, at least one motor contiguous with the fan, a motor driver, a fan driver, at least one temperature sensor sensing the temperature in the computer case, and a controller. The fan defines an air outlet facing the computer case. The plate is slidable relative to the air outlet to open or close the air outlet. The motor is configured for moving the plate. The motor driver is configured for driving the motor to work. The fan driver is configured for driving the fan to rotate. When the sensed temperature is higher than a preset threshold temperature, the controller controls the motor to move the plate from the air outlet, and controls the fan to rotate.

20 Claims, 5 Drawing Sheets

HEAT DISSIPATION DEVICE

BACKGROUND

1. Technical Field

The present disclosure relates to a heat dissipation device and, particularly, to a heat dissipation device for a host computer.

2. Description of Related Art

Fans are often mounted on central processing units, power units, and video cards of computers to cool these units. Conventionally the cases of the computers have slots or holes to vent heated air from the computers to facilitate heat dissipation. However, as the development of computer performance increases, more powerful components are generating more heat. The slots are insufficient to timely and efficiently dissipate the heat.

What is needed, therefore, is a heat dissipation device to overcome the above-described problem.

BRIEF DESCRIPTION OF THE DRAWINGS

Many aspects of the heat dissipation device can be better understood with reference to the following drawings. The components in the drawings are not necessarily drawn to scale, the emphasis instead being placed upon clearly illustrating the principles of the heat dissipation device.

DETAILED DESCRIPTION

Embodiments of the present disclosure will now be described in detail below, with reference to the accompanying drawings.

Figure 1:
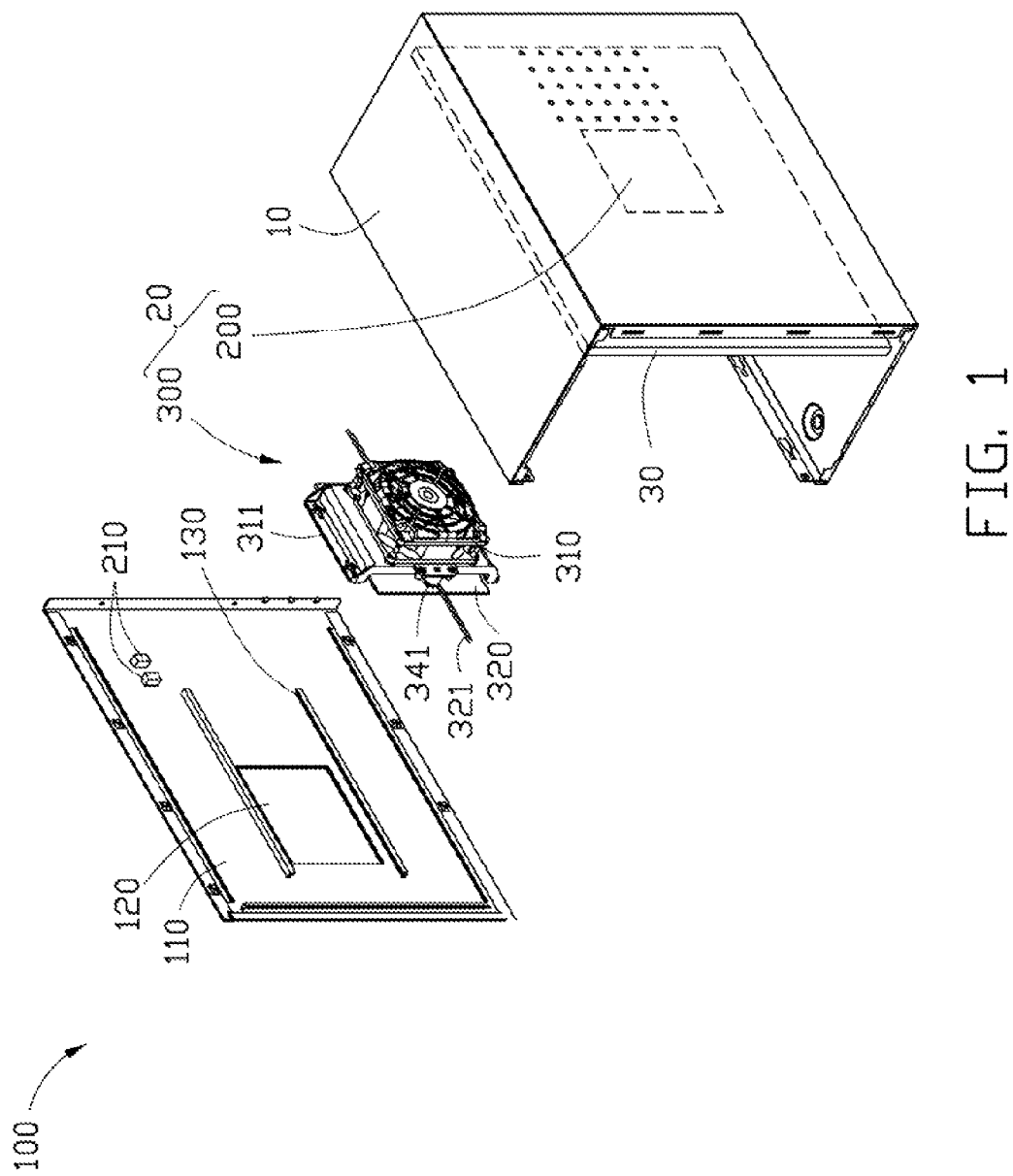
FIG. 1 is an exploded, schematic view of a host computer with a heat dissipation device according to one embodiment.
Figure 2:
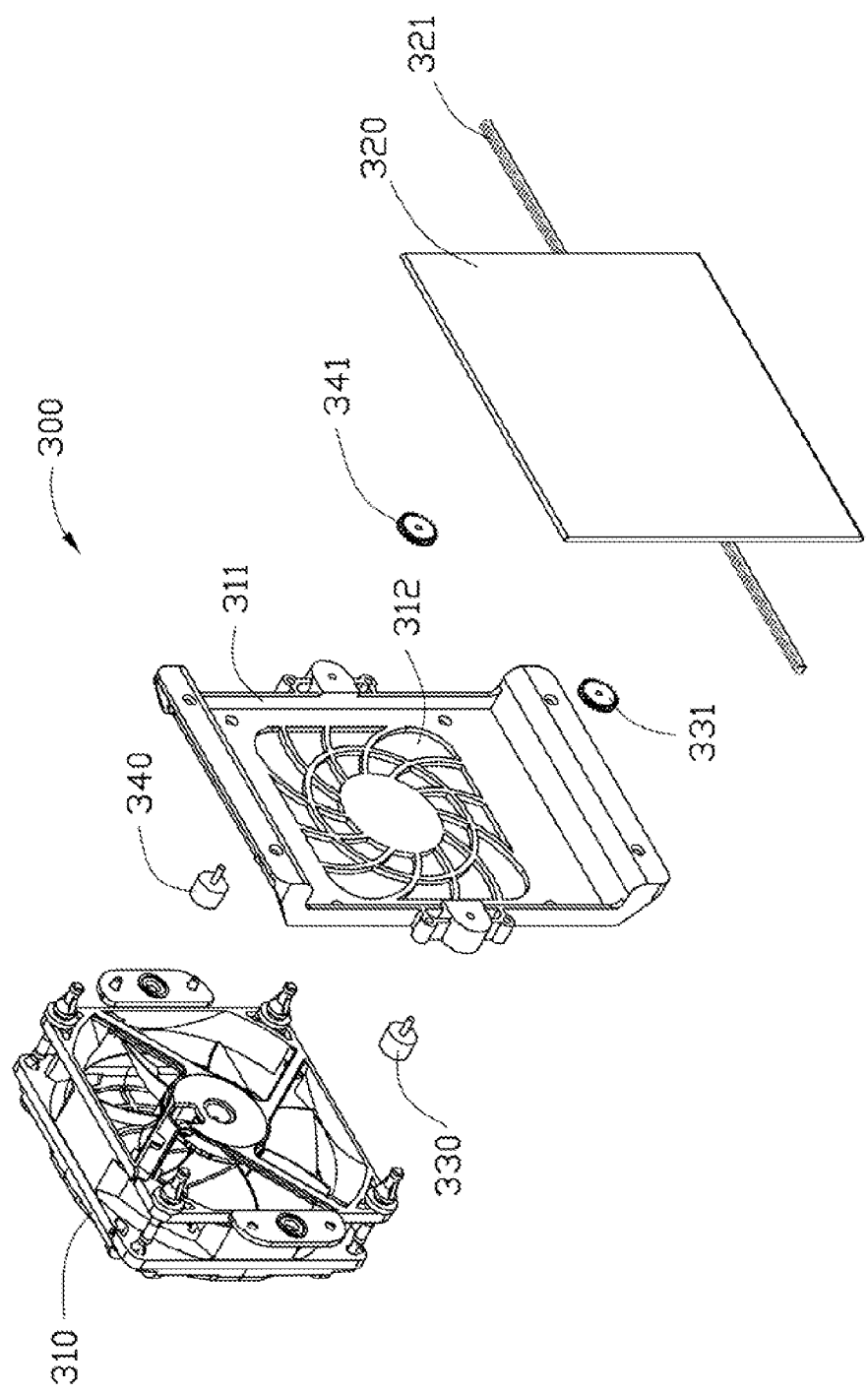
FIG. 2 is a schematic view of a heat dissipation module of the heat dissipation device of FIG. 1.

Referring to FIGS. 1 and 2, a host computer 100 according to one embodiment, is shown. The host computer 100 includes a housing 10, a heat dissipation device 20, and a circuit board 30. The heat dissipation device 20 and the circuit board 30 are fixed in the housing 10. In the present embodiment, the circuit board 30 is a motherboard.

An opening 120 is defined in a sidewall 110 of the housing 10. Two substantially parallel sliding tracks 130 are fixed on the inner surface of the sidewall 110 corresponding to two opposite sides of the opening 120.

The heat dissipation device 20 includes a controlling module 200 and a heat dissipation module 300. The controlling module 200 is fixed on the circuit board 30. The heat dissipation module 30 is fixed on the housing 10.

The heat dissipation module 300 includes a fan 310, a plate 320, a first motor 330, and a second motor 340. The fan 310 includes a fan holder 311 defining an air outlet 312 facing the opening 120. The fan 310 is fixed on the inner side of the housing 10 by the fan holder 311.

The plate 320 is positioned between the fan holder 311 and the sidewall 110 for covering the air outlet 312. Two opposite edges of the plate 320 are movably received in the sliding tracks 130. A rack gear 321 is fixed on the plate 320. The first motor 330 and the second motor 340 are fixed on opposite sides of the fan 310. In the present embodiment, the first motor 330 and the second motor 340 are two-phase stepper motors. A first gear 331 and a second gear 341 are mounted on the first motor 330 and the second motor 340 respectively. Both the first gear 331 and the second gear 341 mesh with the rack gear 321 to drive the plate 320 along the sliding tracks 130.

Figure 3:
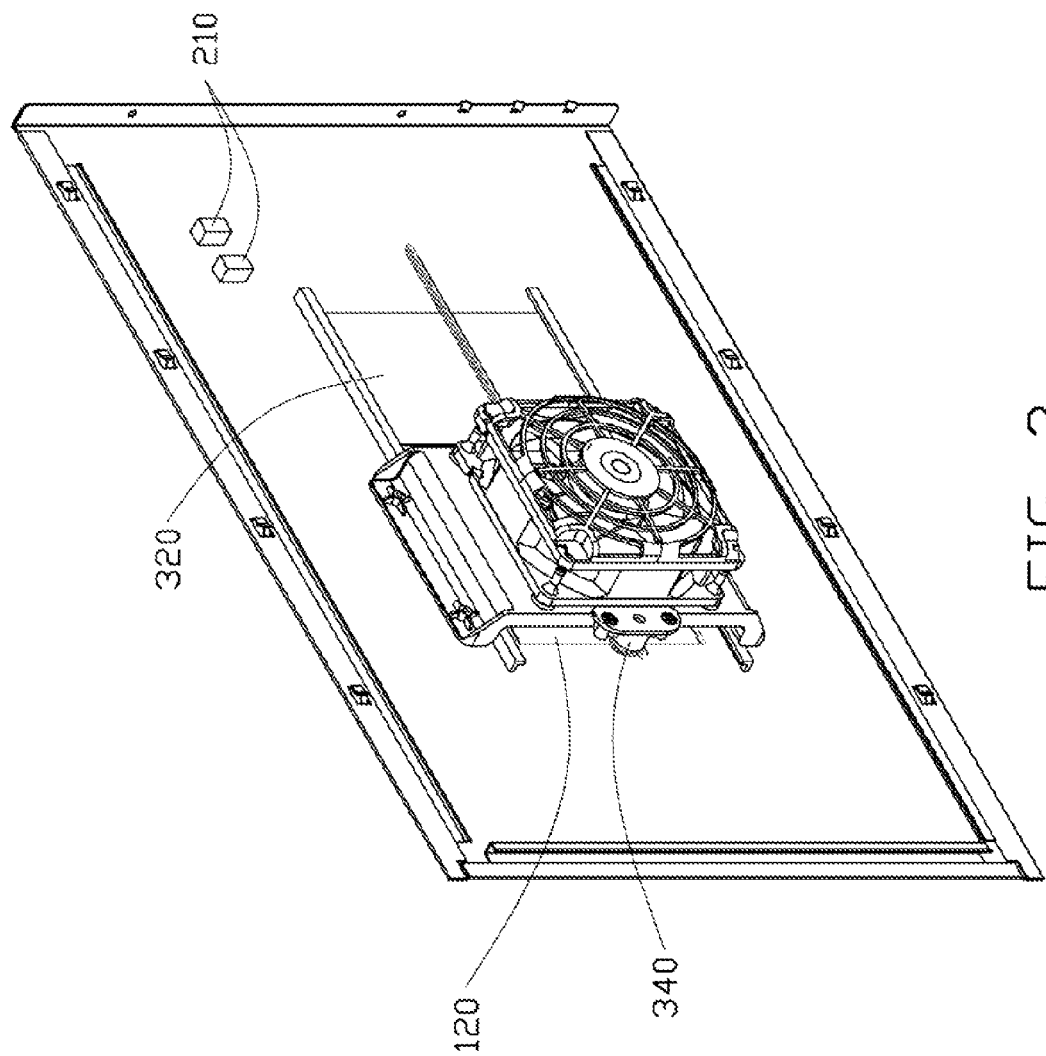
FIG. 3 is an assembly view of the heat dissipation device of FIG. 1, showing the heat dissipation device in a working state.
Figure 4:
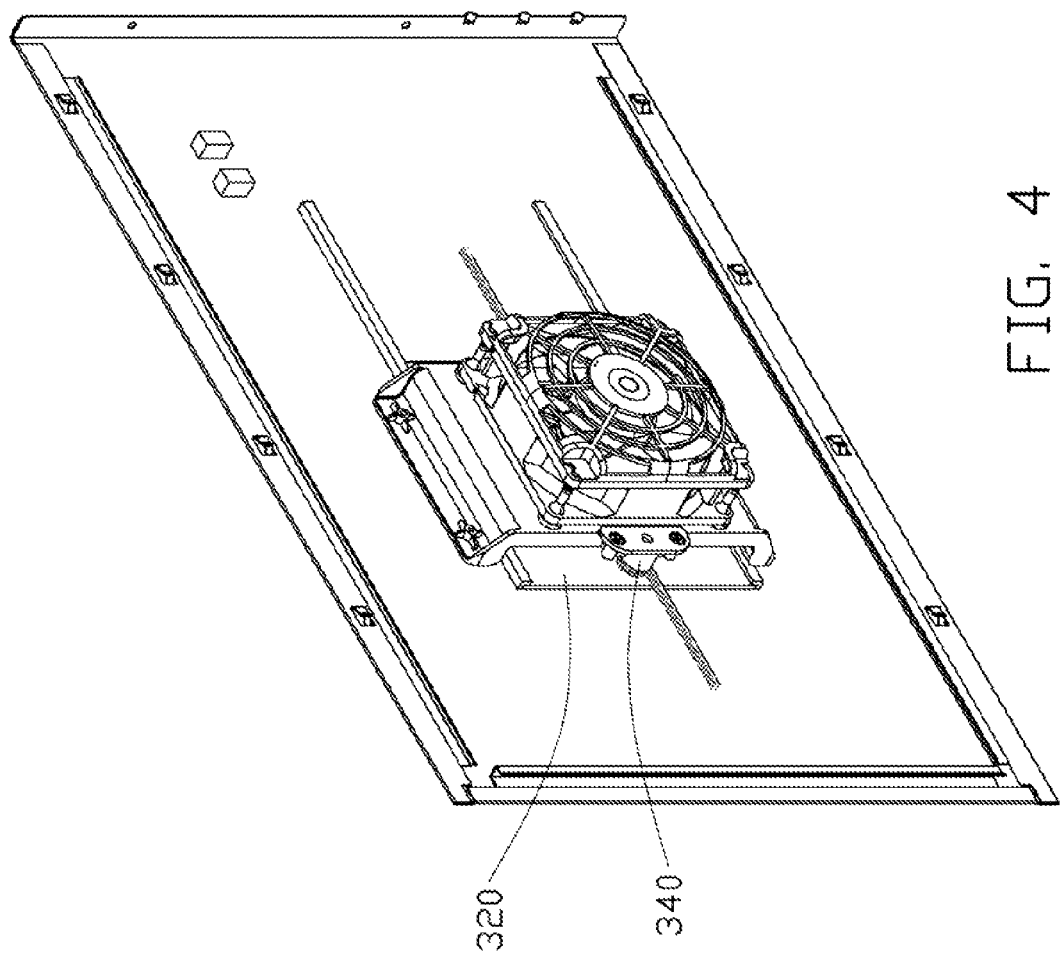
FIG. 4 is similar to FIG. 3, but showing the heat dissipation device in an idle state.

Referring to FIGS. 3 and 4, when the first motor 330 pulls the plate 320 and the second motor 340 pushes the plate 320 to drive the plate 320 along the sliding tracks 130, the air outlet 312 is opened and communicates with the opening 120. When the first motor 330 pushes the plate 320 and the second motor 340 pulls the plate 320, the air outlet 312 is covered again by the plate 320 and isolated from the opening 120. In an alternative embodiment, only one of the first motor 330 and the second motor 340 is employed if the employed motor is capable of efficiently driving the plate 320 along the sliding tracks 130.

Figure 5:
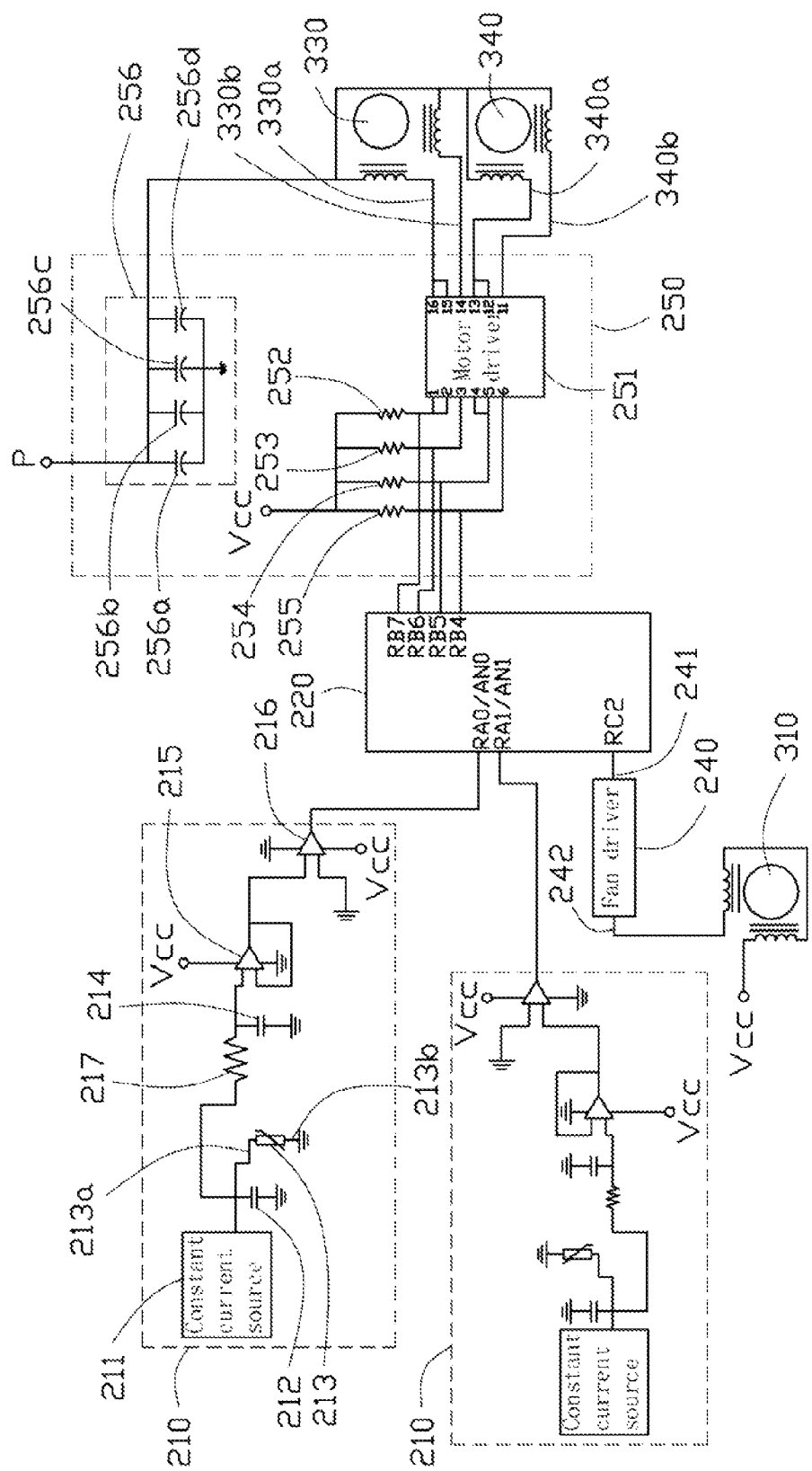
FIG. 5 is a schematic view of a control circuit of the heat dissipation device of FIG. 1.

Referring to FIGS. 1 and 5, the controlling module 200 includes two temperature sensing circuits 210, a main controller 220, a fan driver 240, and a motor driving circuit 250. The temperature sensing circuits 210, the fan driver 240, and the motor driving circuit 250 are all electrically connected to the main controller 220.

The temperature sensing circuits 210 are provided to sense the temperature inside the host computer 100. Each temperature sensing circuit 210 includes a constant current source 211, a first capacitor 212, a temperature sensor 213, a second capacitor 214, an isolation amplifier 215, an amplifier 216, and a current limiting resistor 217. In the present embodiment, the constant current source 211, the first capacitor 212, the temperature sensor 213, the second capacitor 214, the isolation amplifier 215, the amplifier 216, and the current limiting resistor 217 are installed on the circuit board 30. The two temperature sensors 213 are installed on the inner surface of the sidewall 110. The two temperature sensors 213 are positioned contiguous to each other to sense the temperature of substantially the same area, in case one should fail. The two temperature sensors 213 are connected in parallel to the main controller 220.

A first terminal 213a of the temperature sensor 213 is electrically connected to the constant current source 211, and another terminal 213b of the temperature sensor 213 is grounded. The first terminal 213a of the temperature sensor 213 is also electrically connected to the non-inverting input of the isolation amplifier 215 by the current limiting resistor 217. The current limiting resistor 217 is provided for limiting the current to the isolation amplifier 215 and further filtering noise from the current. The output of the isolation amplifier 215 is electrically connected to the inverting input of the amplifier 216. The output of the amplifier 216 is electrically connected to the main controller 220. An end of the first capacitor 212 is electrically connected between the first terminal 213a of the temperature sensor 213 and the constant current source 211, and an opposite end of the first capacitor 212 is grounded. The first capacitor 212 is provided for filtering noise from the current to improve the precision of the temperature sensor 213. An end of the second capacitor 214 is electrically connected between the output of the current limiting resistor 217 and the non-inverting input of the isolation amplifier 215, an opposite end of the second capacitor 214 is grounded.

The temperature sensors 213 are NTSD1XM202FPB30 thermistors. The temperature sensors 213 are provided for detecting the temperature inside the housing 10. In an alternative embodiment, the host computer 100 can also use one or more than two temperature sensors 213.

The constant current sources 211 are provided for supplying a corresponding stable power to the two temperature sensors 213. In the present embodiment, the constant current sources 211 are LM334 feedback constant current sources.

The amplifiers 216 are configured for amplifying the signals from the temperature sensors 213. The isolation amplifiers 215 are configured for increasing the power of the signal from the temperature sensors 213.

In the present embodiment, the main controller 220 is installed on the circuit board 30. The main controller 220 is a PIC16C73 chip. The main controller 220 includes two input terminals RA0/AN0 and RA1/AN1, a fan controlling output terminal RC2, two first motor controlling output terminals RB7 and RB6, and two second motor controlling output terminals RB5 and RB4. The input terminals RA0/AN0 and RA1/AN1 are respectively electrically connected to a corresponding temperature sensing circuit 210.

The motor driving circuit 250 is electrically connected to the first motor 330 and the second motor 340 and includes a motor driver 251, four pull-up resistors 252, 253, 254 and 255, and a voltage stabilizing circuit 256. The motor driver 251 is electrically connected to the first and second motors 330, 340 for driving the first motor 330 and the second motor 340. The pull-up resistors 252, 253, 254 and 255 are connected in parallel between the main controller 220 and the motor driver 251 for increasing the driving capacity of the motor driver 220. The voltage stabilizing circuit 256 is electrically connected to the first and second motors 330, 340 for preventing the circuit board 30 from resetting when the first motor 330 and the second motor 340 are started. In the present embodiment, the motor driver 251 simultaneously drives the first motor 330 and the second motor 340 to rotate in opposite directions. The motor driver 251 is installed on the circuit board 30. The motor driver 251 is a ULN2003 chip.

The motor driver 251 includes six inputs 1-6 and six outputs 11-16. The inputs 1 and 2 are electrically connected together to form a first common input, the first common input is electrically connected to both the output terminal RB7 of the main controller 220 and the pull-up resistor 252. The input 3 is electrically connected to both the output terminal RB6 and the pull-up resistor 253. The outputs 16 and 15 are both electrically connected to one pole 330a of the first motor 330. The output 14 is electrically connected to the other pole 330b of the first motor 330.

The inputs 4 and 5 of the motor driver 251 are electrically connected together to form a second common input, the second common input is electrically connected to both the output terminal RB5 of the main controller 220 and the pull-up resistor 254. The input 6 of the motor driver 251 is electrically connected to both the output terminal RB4 and the pull-up resistor 255. The inputs 1 and 2 of the motor driver 251 are electrically connected together and the inputs 4 and 5 of the motor driver 251 are electrically connected together for increasing the driving capacity of the motor driver 220. The outputs 13 and 12 of the motor driver 251 are both electrically connected to one pole 340a of the second motor 340. The output 11 of the motor driver 251 is electrically connected to the other pole 340b of the second motor 340.

The outputs 15 and 16 of the motor driver 251 are electrically connected together to the first motor 330 and the outputs 12 and 13 of the motor driver 251 are electrically connected together for increasing the driving capacity of the motor driver 220.

The first motor 330 and the second motor 340 are supplied by a power supply P of the circuit board 30. The voltage stabilizing circuit 256 is provided between the power supply P and the first and second motors 330, 340. The voltage stabilizing circuit 256 includes four capacitors 256a, 256b, 256c, and 256d connected in parallel between the power supply P and the first motor 330.

The fan driver 240 is provided for driving the fan 310. In the present embodiment, the fan driver 240 is installed on the circuit board 30. The fan driver 240 includes a fan driver input 241 and a fan driver output 242. The input 241 is electrically connected to the output RC2 of the main controller 220. The output 242 is electrically connected to the fan 310.

In the present embodiment, a first threshold temperature value and a second threshold temperature value lower than the first threshold temperature value are pre-stored in the main controller 220. When the main controller 220 receives signals from the temperature sensors 213, the main controller 220 converts the signals to digital values and compares the digital values with the first threshold temperature value and the second threshold temperature value. When the digital values are higher than the first threshold temperature value, the output terminals RB4, RB5, RB6, and RB7 each output a first controlling signal to the motor driving circuit 250. The output terminal RC2 outputs a second controlling signal to the fan driver 240. The motor driver 251 receives the first controlling signal from the output terminals RB4, RB5, RB6, and RB7, the motor driver 251 drives the first motor 330 to pull the plate 320, and drives the second motor 340 to push the plate 320.

When the digital values are lower than the second threshold temperature value and the fan is running, the output terminals RB4, RB5, RB6, and RB7 each output a third controlling signal to the motor driving circuit 250. The output terminal RC2 outputs a fourth controlling signal to the fan driver 240. The running of the fan 310 can be detected by the main controller 220 according to the state of a variable. In the present embodiment, a variable is pre-stored and updated in the main controller 220. The variable can be changed between "0" and "1." The variable is initially set to "0" and changed to "1" by the main controller 220 when the output terminal RC2 outputs a second controlling signal to the fan driver 240. The variable is changed back to "0" when the output terminal RC2 outputs a fourth controlling signal to the fan driver 240. When the digital values are lower than the second threshold temperature value and the variable is "1", the main controller 310 outputs a third controlling signal to the motor driving circuit 250 and outputs a fourth controlling signal to the fan driver 240. When the motor driver 251 receives the third controlling signal from the output terminals RB4, RB5, RB6, and RB7, the motor driver 251 drives the first motor 330 to push the plate 320, and drives the second motor 340 to pull the plate 320.

In an alternative embodiment, only one threshold temperature value may be pre-stored in the main controller 220. When the digital values are higher than the threshold temperature value, the main controller 220 controls the motor driving circuit 250 and the fan driver 240 to activate the fan 310 and move the plate 320 to uncover the opening 120. The main controller 220 is electrically connected to a CPU (not shown) of the host computer 100. The main controller 220 controls the fan 310 to stop and the plate 320 is moved to cover the opening 120 again until the host computer 100 receives a power off signal from the CPU, and the main controller 220 sends a feedback signal to the CPU to power off the host computer 100 after the plate 320 covers the opening 120.

In the present embodiment, the main controller 220 is programmed to firstly output the first controlling signal to the motor driving circuit 250, and after a delay, such as about one second, output the second controlling signal to the fan driver 240. When the digital values are higher than the first threshold temperature value, the opening 120 is opened before the fan 300 begins operating. The main controller 220 is programmed to firstly output the fourth controlling signal to the fan driver 240, and after a delay, such as about one second, output the third controlling signal to the motor driving circuit 250. When the digital values are lower than the second threshold temperature value, the opening 120 is closed after the fan 300 stops.

In the present embodiment, the main controller 220 is pre-programmed to control the number of rotation steps of the first motor 330 and the second motor 340 each time the plate 320 is moved to open or close the opening 120, so as to stop the plate 320 at the preset position. In an alternative embodiment, position switches (not shown) are provided for signaling the main controller 220 to stop the plate 320 at preset positions.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A heat dissipation device positioned in a computer case, comprising:
    a fan received in the computer case and defining an air outlet facing the computer case;
    a plate positioned between an inner surface of the computer case and the fan, and slidable relative to the air outlet to open or close the air outlet;
    at least one motor fixed on two opposite sides of the fan, moving the plate relative to the air outlet;
    a motor driver installed into the computer case and electrically connected to the at least one motor, driving the at least one motor;
    a fan driver installed into the computer case and electrically connected to the fan, driving the fan;
    at least one temperature sensor installed into the computer case, sensing the temperature in the computer case;
    a controller electrically connected to the at least one temperature sensor, the motor driver, and the fan driver, wherein when the temperature detected by the at least one temperature sensor is higher than a preset threshold temperature, the controller signals the motor driver to activate the motor to move the plate from the air outlet and the fan driver to activate the fan to cool the computer case.

2. The heat dissipation device as claimed in claim 1, wherein the controller signals the motor driver to activate the motor to move the plate to cover the air outlet and the fan driver to turn off the fan when the temperature detected by the temperature sensor is lower than the threshold temperature and the fan has been started.

3. The heat dissipation device as claimed in claim 1, wherein the controller signals the motor driver to activate the motor to move the plate to cover the air outlet and the fan driver to turn off the fan when the fan has been started and the temperature detected by the at least one temperature sensor is lower than another preset threshold temperature which is lower than the preset threshold temperature.

4. The heat dissipation device as claimed in claim 2, wherein the at least one temperature sensor comprises two temperature sensors contiguous to each other.

5. The heat dissipation device as claimed in claim 4, wherein the two temperature sensors are connected in parallel to the controller.

6. The heat dissipation device as claimed in claim 1, further comprising at least one constant current source supplying a stable power to the at least one temperature sensor.

7. The heat dissipation device as claimed in claim 4, wherein the at least one motor comprises two motors, the motor driver simultaneously drives the two motors to rotate in opposite directions.

8. The heat dissipation device as claimed in claim 6, further comprising a capacitor electrically connected to the constant current source and the temperature sensor in parallel.

9. The heat dissipation device as claimed in claim 2, further comprising an amplifier connecting the temperature sensor to the controller and amplifying the signals from the temperature sensor.

10. The heat dissipation device as claimed in claim 9, further comprising an isolation amplifier electrically connected the temperature sensor to the amplifier to increase the power of the signal from the temperature sensor.

11. The heat dissipation device as claimed in claim 8, further comprising a current limiting resistor electrically connected the at least one temperature sensor to the isolation amplifier and limiting the current to the isolation amplifier and further filtering noise in the current.

12. The heat dissipation device as claimed in claim 1, further comprising a voltage stabilizing circuit electrically connecting the at least one motor to a power supply.

13. The heat dissipation device as claimed in claim 12, wherein the voltage stabilizing circuit includes four capacitors in parallel to each other.

14. A heat dissipation device positioned in a computer case, comprising:
    a fan with an air outlet received in the computer case;
    a plate slidable relative to the air outlet to cover or uncover the air outlet;
    at least one motor fixed on two opposite sides of the fan to move the plate;
    at least one temperature sensor installed into the computer case to sense the temperature in the computer case;
    a controller obtaining a detected temperature from the temperature sensor and comparing the detected temperature to a pre-stored threshold temperature, wherein when the detected temperature is higher than the pre-stored threshold temperature, the controller controls the motor to move the plate from the air outlet and activate the fan.

15. The heat dissipation device as claimed in claim 14, further comprising a motor driver connecting the motor to the controller and a fan driver connecting the fan to the controller.

16. The heat dissipation device as claimed in claim 15, wherein the controller signals the motor driver to activate the motor to move the plate to cover the air outlet, and signals the fan driver to turn off the fan when the detected temperature is lower than the threshold temperature and the fan has been started.

17. The heat dissipation device as claimed in claim 15, wherein the controller signals the motor driver to activate the motor to move the plate to cover the air outlet, and signals the fan driver to turn off the fan when the fan has been started and the detected temperature is lower than another preset threshold temperature which is lower than the preset threshold temperature.

18. The heat dissipation device as claimed in claim 15, wherein the at least one temperature sensor comprises two temperature sensors contiguous to each other.

19. The heat dissipation device as claimed in claim 18, wherein the two temperature sensors are connected in parallel to the controller.

20. The heat dissipation device as claimed in claim 1, further comprising at least one constant current source supplying a stable power to the at least one temperature sensor.

* * * * *